(12) United States Patent
Ho

(10) Patent No.: US 7,330,926 B2
(45) Date of Patent: Feb. 12, 2008

(54) INTERRUPTION CONTROL SYSTEM

(75) Inventor: Tony Ho, Taipei (TW)

(73) Assignee: Via Technologies, Inc., Taipei (TW)

( * ) Notice: Subject to any disclaimer, the term of this patent is extended or adjusted under 35 U.S.C. 154(b) by 0 days.

(21) Appl. No.: 11/735,111

(22) Filed: Apr. 13, 2007

(65) Prior Publication Data

US 2007/0186023 A1 Aug. 9, 2007

Related U.S. Application Data

(63) Continuation-in-part of application No. 10/980,443, filed on Nov. 3, 2004, now abandoned.

(30) Foreign Application Priority Data

Nov. 20, 2003 (TW) .............................. 92132621 A

(51) Int. Cl.
*G06F 13/36* (2006.01)
*G06F 13/20* (2006.01)
*G06F 12/00* (2006.01)
*G06F 1/00* (2006.01)
*G06F 13/24* (2006.01)

(52) U.S. Cl. ...................... 710/311; 710/313; 710/260; 710/261; 711/106; 713/310; 713/324

(58) Field of Classification Search ................ 710/311, 710/313, 260, 261; 711/106; 713/324, 310
See application file for complete search history.

(56) References Cited

U.S. PATENT DOCUMENTS 5,640,571 A 6/1997 Hedges et al.
5,857,090 A 1/1999 Davis et al.
6,065,122 A 5/2000 Wunderlich et al.
6,192,439 B1 2/2001 Grunewald et al.
6,697,387 B1 2/2004 Larson
6,732,280 B1 5/2004 Cheok et al.
6,823,414 B2 11/2004 Radhakrishna (Continued)

OTHER PUBLICATIONS

AMD, Incompatibilities Between the AMD-762 system controller and the Via Technologies, Inc. VT82C686B "Super South" Southbridge, Jun. 2001.*

(Continued)

*Primary Examiner*—Mark H. Rinehart
*Assistant Examiner*—Christopher A. Daley
(74) *Attorney, Agent, or Firm*—Kirton & McConkie; Evan R. Witt

(57) ABSTRACT

An interruption control system includes a PIC, an APIC and a power management unit disposed in a south bridge chip of a computer system. In response to the triggering of an interrupt status indicating signal received through an interrupt status indicating pin of a north bridge module or by the triggering of a peripheral device coupled to the south bridge chip, the PIC sends an interrupt signal to the CPU via an interrupt request signal pin when the computer system is in a PIC mode. The APIC is disabled when the computer system is in the PIC mode, and enabled when the computer system is in an APIC mode to generate a memory write cycle message to the CPU in response to the triggering of the peripheral device. The power management unit is optionally triggered with the interrupt signal or the interrupt status indicating signal to awake the CPU.

9 Claims, 4 Drawing Sheets

U.S. PATENT DOCUMENTS

| | | |
|---|---|---|
| 6,983,339 B1 | 1/2006 | Rabe et al. |
| 7,039,755 B1 | 5/2006 | Helms |
| 2002/0083349 A1 | 6/2002 | Khatri et al. |
| 2003/0018892 A1 | 1/2003 | Tello |
| 2003/0081741 A1 | 5/2003 | Anne et al. |
| 2004/0003322 A1 | 1/2004 | Collins et al. |
| 2005/0114723 A1 | 5/2005 | Ho et al. |
| 2005/0120154 A1 | 6/2005 | Ho et al. |
| 2006/0047984 A1 | 3/2006 | Ho et al. |

OTHER PUBLICATIONS

Karbosguide.com, An Illustrated Guide to chipsets, What is Super 7, 2003.*

U.S. Appl. No. 10/980,443, titled "Interruption Control System and Method" filed Nov. 3, 2004, with inventor(s) Tony Ho, Chung-Ching Huang, Norman Chung.

Rieker, Mike. "Advanced Programmable Interrupt Controller". Revision 1.1.1.1. Jul. 2, 2002. pp. 1-8. Retrieved from Internet May 20, 2006. <http://osdev.berlios.de/pic.html>.

Advanced Configuration and Power Interface Specification. Revision 2.0. Jul. 27, 2000. Compaq Computer Corporation et al. Chapters 1-4. pp. i-xiv and 1-84.

Mike Rieker; "Advanced Programmable Interrupt Controller"; Jul. 7, 2002, retrieved from Internet Jul. 21, 2006; http://osdev.berlios.de/pic.html.

* cited by examiner

INTERRUPTION CONTROL SYSTEM

CROSS REFERENCE TO RELATED PATENT APPLICATION

This patent application is a continuation-in-part (CIP) application of a U.S. patent application Ser. No. 10/980,443 filed Nov. 3, 2004 and now abandoned. The contents of the related patent application are incorporated herein for reference.

FIELD OF THE INVENTION

The present invention relates to an interruption control system, and more particularly to an interruption control system for use with a computer system.

BACKGROUND OF THE INVENTION

Power-saving means is widely used to minimize power consumption in a computer system. Many kinds and levels of power-saving modes are developed to achieve the purpose. One of the examples is so-called as ACPI. ACPI (Advanced Configuration and Power Management Interface) is a specification defining standard interfaces for hardware configuration and power management of the power-saving means. According to the ACPI specification, the central processing unit (CPU) of the computer system operates in various power states, e.g. C1, C2, C3, etc. Different power states result in different levels of power saving effects. For any power-saving mechanism, it is important to reduce power consumption while providing a stable operational environment for circuit at a relatively low temperature.

Generally speaking, the power management for the CPU of the computer system is implemented with the south bridge chip of the chipset. Referring to a conventional computer scheme of FIG. 1, for activating and deactivating power-saving modes, the south bridge chip 2 includes a stop clock control module 20 coupled to the CPU 1 and north bridge chip 3, and an interrupt controller 22 coupled to the stop clock control module 20 and one or more peripheral equipment, e.g. peripheral device 4.

When the operating system (OS) of the computer system is to enter a power-saving state, the CPU 1 issues a sleep command to the south bridge chip 2. In response to the sleep command, the stop clock control module 20 of the south bridge chip 2 asserts a stop clock signal STPCLK# to the CPU 1 via a clock signal pin 21. Once the STPCLK# signal is generated, the CPU 1 issues a stop grant signal STPGNT to the south bridge chip 2 via the north bridge chip 3 through data buses connecting thereto. In response to the STPGNT signal, the CPU 1, as well as the entire computer system, enters the power-saving state so as to reduce power consumption.

Afterwards, the CPU 1 need be awaked when interrupted by any of the peripheral devices. For example, in response to the receipt of an interrupt signal issued by the peripheral device 4 via the interrupt signal pin 40, the interrupt controller 22 of the south bridge chip 2 issues a wake-up signal to trigger the stop clock control module 20 of the south bridge chip 2 to de-assert the STPCLK# signal. Thus, the CPU 1 and the entire computer system are awaked to recover to the normal operation state.

With the increasing number and variety of peripheral devices and highly advance of computer's performance, new and diverse architectures of computer systems have been developed. For example, as shown in FIG. 2, peripheral equipment such as second peripheral device 6 can be connected to the north bridge chip 3 other than the south bridge chip 2. However, the computer system cannot process interrupts from the second peripheral device 6 via the north bridge chip 3 even though a second interrupt controller 50 can be disposed between the second peripheral device 6 and north bridge chip 3 if the second interrupt controller 50 is implemented with a programmable interrupt controller (PIC). Nowadays, an input/output advanced programmable interrupt controller (IO APIC) has been developed for solving interrupt routing efficiency issues. Unfortunately, interrupts from the second peripheral device 6 are still unable to wake up the CPU or computer system in the C2/C3 mode of the ACPI specification to do interrupt service even if the second interrupt controller 50 is implemented with an IO APIC.

SUMMARY OF THE INVENTION

The present invention provides an interruption control system for use with a computer system, which can effectively wake up the computer system from the power-saving state to the normal operation state when any of the peripheral devices coupled to either the south bridge chip or north bridge chip issues an interrupt signal in either the PIC mode or IO APIC mode.

The present invention provides an interruption control system for use with a computer system. The computer system includes a CPU, a north bridge module including a north bridge chip, a south bridge chip and a first peripheral device. The interrupt control system includes a programmable interrupt controller (PIC) disposed in the south bridge chip, coupled to the first peripheral device, an interrupt status indicating pin of the north bridge module and the CPU, and optionally triggered with an interrupt status indicating signal received through the interrupt status indicating pin or by the first peripheral device to send an interrupt signal to the CPU via an interrupt request signal pin when the computer system is in a PIC mode; a first advanced programmable interrupt controller (APIC) disposed in the south bridge chip, coupled to the first peripheral device, disabled when the computer system is in the PIC mode, and enabled when the computer system is in an APIC mode to generate a first memory write cycle message to the CPU in response to the triggering of the first peripheral device; and a power management unit disposed in the south bridge chip, coupled to the CPU, the interrupt status indicating pin of the north bridge module and the PIC, and optionally triggered with the interrupt signal received from the PIC or the interrupt status indicating signal received from the interrupt status indicating pin of the north bridge module to change a state of a stop clock signal to awake the CPU from a power-saving state.

In an embodiment, the interruption control system further includes a BT_INTR controller disposed in a PCI-to-PCI bridge device of the north bridge module between the north bridge chip and a second peripheral device of the computer system, and coupled to the south bridge chip via the interrupt status indicating pin for transmitting the interrupt status indicating signal to the power management unit in response to the triggering of the second peripheral device; and a second advanced programmable interrupt controller (APIC) disposed in the PCI-to-PCI bridge device, coupled to the second peripheral device, disabled when the computer system is in the PIC mode, and enabled when the computer system is in the APIC mode to generate a second memory write cycle message to the CPU in response to the triggering of the second peripheral device.

In another embodiment, the interruption control system further includes a BT_INTR controller disposed in the north bridge chip of the north bridge module, coupled to a second peripheral device of the computer system, and further coupled to the south bridge chip via the interrupt status indicating pin for transmitting the interrupt status indicating signal to the power management unit in response to the triggering of the second peripheral device; and a second advanced programmable interrupt controller (APIC) disposed in the north bridge chip, coupled to the second peripheral device, disabled when the computer system is in the PIC mode, and enabled when the computer system is in the APIC mode to generate a second memory write cycle message to the CPU in response to the triggering of the second peripheral device.

BRIEF DESCRIPTION OF THE DRAWINGS

The contents of the present invention will become more readily apparent to those ordinarily skilled in the art after reviewing the following detailed description and accompanying drawings, in which.

DETAILED DESCRIPTION OF THE PREFERRED EMBODIMENT

Figure 1:
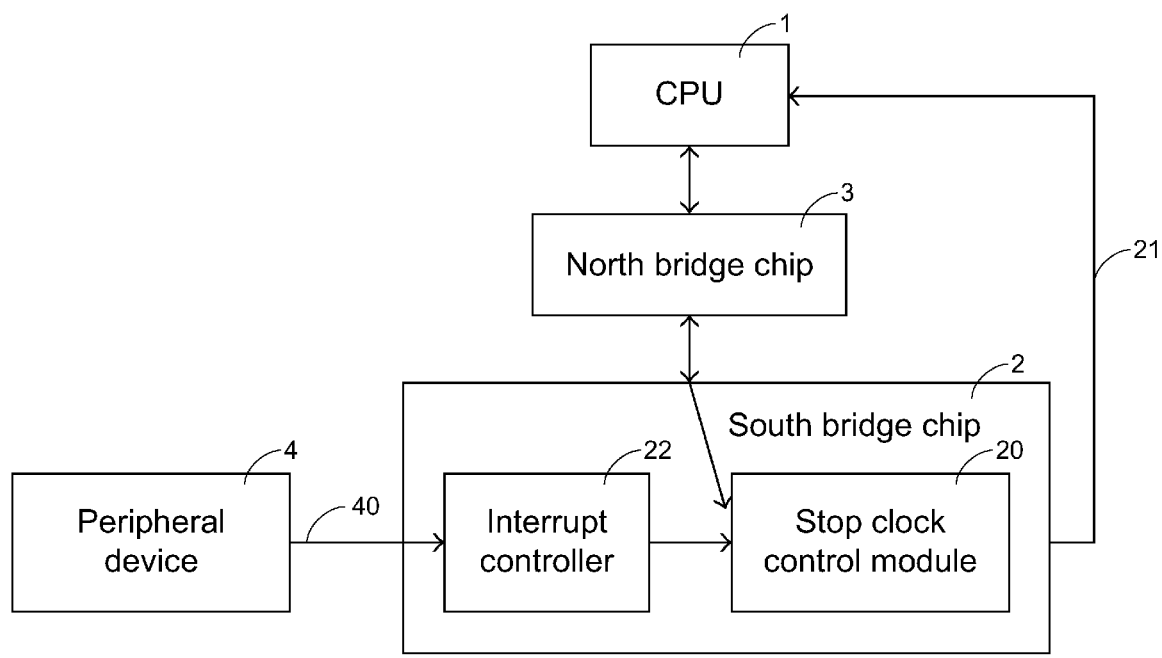
FIG. 1 is a functional block diagram illustrating conventional interruption control means of a computer system.
Figure 2:
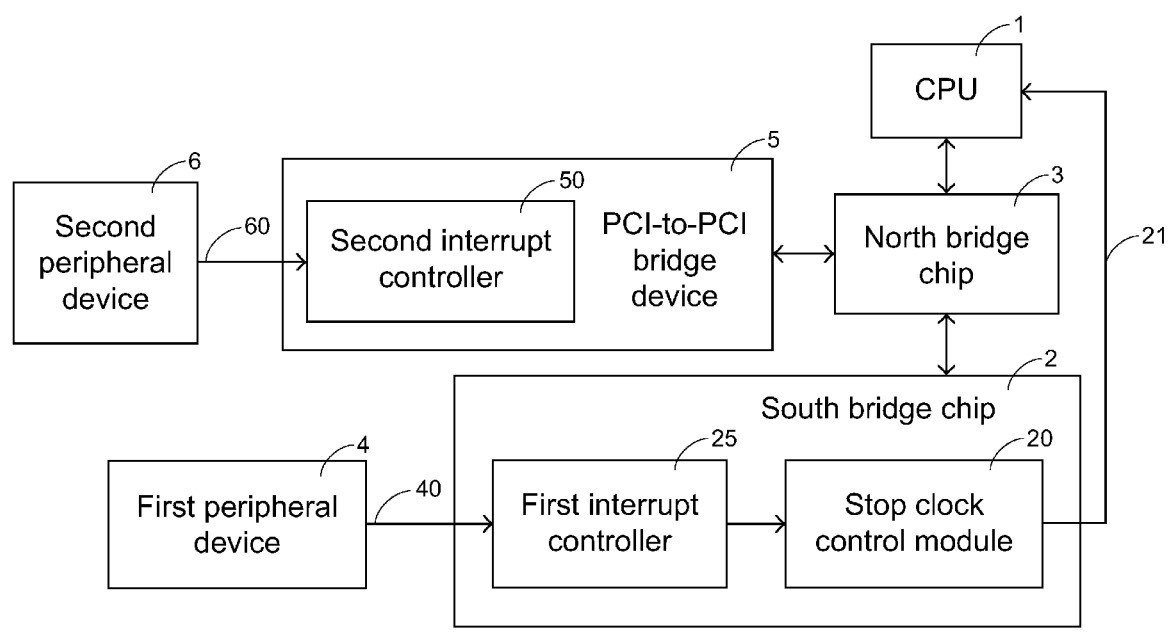
FIG. 2 is a functional block diagram illustrating another conventional interruption control means of a computer system.
Figure 3:
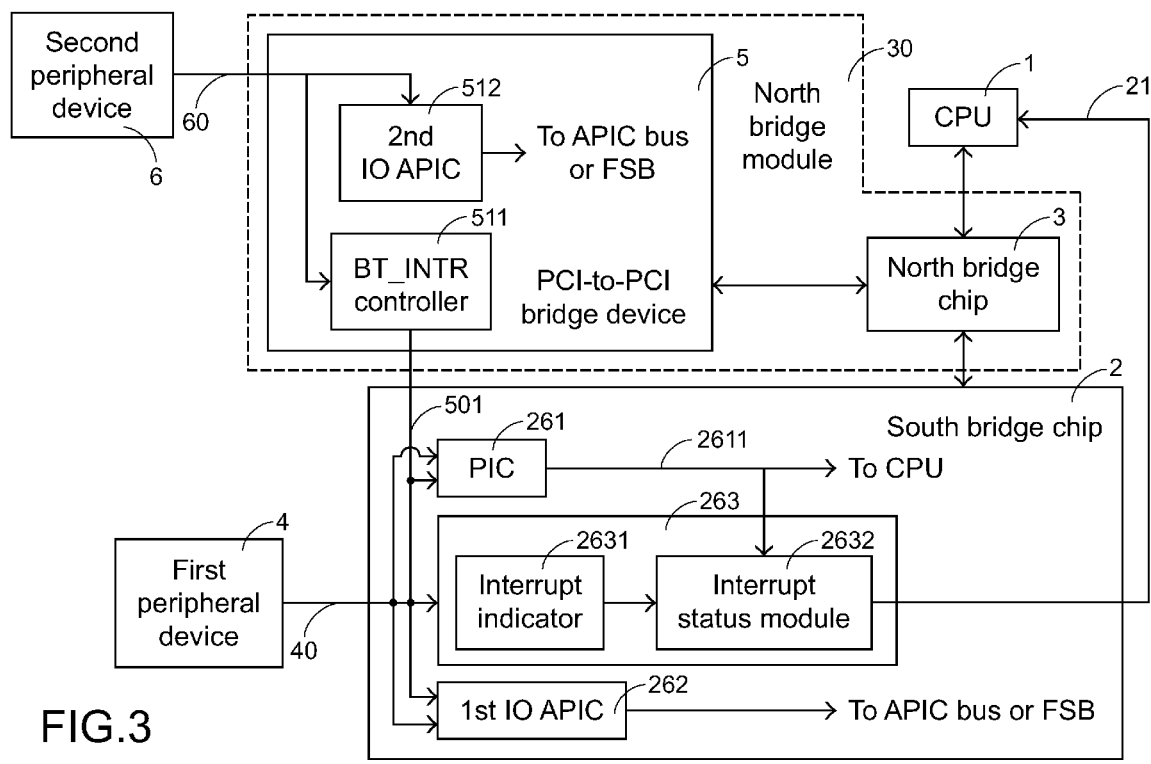
FIG. 3 is a functional block diagram illustrating an interruption control system according to an embodiment of the present invention.

Referring to FIG. 3, an interruption control system according to an embodiment of the present invention is shown. The interruption control system includes a programmable interrupt controller (PIC) 261, a first input/output advanced programmable interrupt controller (IO APIC) 262 and a power management unit 263 disposed in a south bridge chip 3. The power management unit 263 further includes an interrupt indicator 2631 and an interrupt status module 2632. In addition, the interruption control system includes a boot interrupt request (BT_INTR) controller 511 and a second IO APIC 512 disposed in a north bridge module 30. In this embodiment, the BT_INTR controller 511 and second IO APIC 512 are disposed in a PCI-to-PCI bridge device 5 of the north bridge module 30. Alternatively, the BT_INTR controller 511 and second IO APIC 512 can also be integrated into the north bridge chip 3 of the north bridge module 30. The BT_INTR controller 511 further communicates with the PIC 261, first IO APIC 262 and power management unit 263 via an interrupt status indicating pin 501.

When the computer system is going to enter a power-saving state in response to the request from the operating system (OS), the CPU 1 asserts a sleep command to the south bridge chip 2. In response to the sleep command, power management unit 263 of the south bridge chip 2 asserts a stop clock signal STPCLK# to the CPU 1 via a clock signal pin 21. Once the STPCLK# signal is generated, the CPU 1 issues a stop grant signal STPGNT to the south bridge chip 2 via the north bridge chip 3 through data buses connecting thereto. In response to the STPGNT signal, the CPU 1, as well as the entire computer system, enters the power-saving state, e.g. C2 or C3 mode, so as to reduce power consumption.

Afterwards, when an interrupt signal is issued by the peripheral device 4 or 6, the CPU and the computer system are awakened to do a corresponding interrupt service. Hereinafter, the recovery of the CPU from the power-saving state to the normal operational power state for the interrupt service will be described in a PIC mode and an IO APIC mode, respectively.

In a PIC mode, when an interrupt signal is issued by the peripheral device 4, the interrupt signal is transmitted to the PIC 261 via an interrupt signal pin 40, and then transmitted to the CPU 1 via an interrupt request signal pin 2611 to request an interrupt service. As the CPU 1 is in a power-saving state, a wake-up signal is generated by the interrupt status module 2632 in response to the interrupt signal received from the PIC 261, thereby de-asserting the STPCLK# signal. Meanwhile, the interrupt indicator 2631 is turned off and the first IO APIC 262 is masked from receiving the interrupt signal. Accordingly, the CPU can be recovered to the normal operational power state to respond to the interrupt signal.

On the other hand, in an IO APIC mode, the PIC 261 is masked and the interrupt indicator 2631 is turned on. The interrupt signal issued by the peripheral device 4 and transmitted via the interrupt signal pin 40 is received by both the first IO APIC 262 and the interrupt indicator 2631. In response to the interrupt signal, the interrupt indicator 2631 generates an interrupt indicating signal and then the interrupt status module 2632 issues a wake-up signal accordingly to de-assert the STPCLK# signal. Meanwhile, a memory write cycle message, e.g. message signaled interrupt MSI, is generated by the first IO APIC 262 and transmitted to the CPU 1 via an APIC bus or front side bus (FSB) for requesting an interrupt service.

In another example, when an interrupt signal is issued by the peripheral device 6, the interrupt can be processed in a PIC mode or an IO PIC mode. In a PIC mode, the IO APIC 512 is masked from receiving the interrupt signal. Along with the off-state of the interrupt indicator 2631 and the masked state of the IO APIC 262 in the PIC mode, as mentioned above, the interrupt signal is transmitted to the BT_INTR controller 511, then to the PIC 261 via the interrupt status indicating pin 501, and then to the interrupt status module 2632. A wake-up signal is then generated by the interrupt status module 2632 in response to the interrupt signal issued by the peripheral device 6, thereby de-asserting the STPCLK# signal. Accordingly, the CPU can be recovered to the normal operational power state to respond to the interrupt signal.

On the other hand, in an IO APIC mode, the interrupt signal will be transmitted to both the BT_INTR controller 511 and the second IO APIC 512. The interrupt signal transmitted through the BT_INTR controller 511 is sent to the interrupt indicator 2631 and the interrupt stratus module 2632 as the PIC 261 is masked, but omitted by the first IO APIC 262, so as to result in the generation of the wake-up signal, thereby de-asserting the STPCLK# signal. Accordingly, the CPU can be recovered to the normal operational power state. Meanwhile, the second IO APIC 512, in response to the interrupt signal, generates a memory write cycle message, e.g. message signaled interrupt MSI. The memory write cycle message is then transmitted to the CPU 1 via an APIC bus or front side bus (FSB) for requesting a corresponding interrupt service.

It is understood from the above embodiment, the interruption control system of the present invention can effectively wake up the computer system from the power-saving state to the normal operational power state when either the peripheral device coupled to the south bridge chip or the peripheral device coupled to the north bridge chip issues an interrupt signal. Furthermore, the interruption control system of the present invention can effectively wake up the computer system from the power-saving state to the normal operational power state in either the PIC mode or IO APIC mode.

Figure 4:
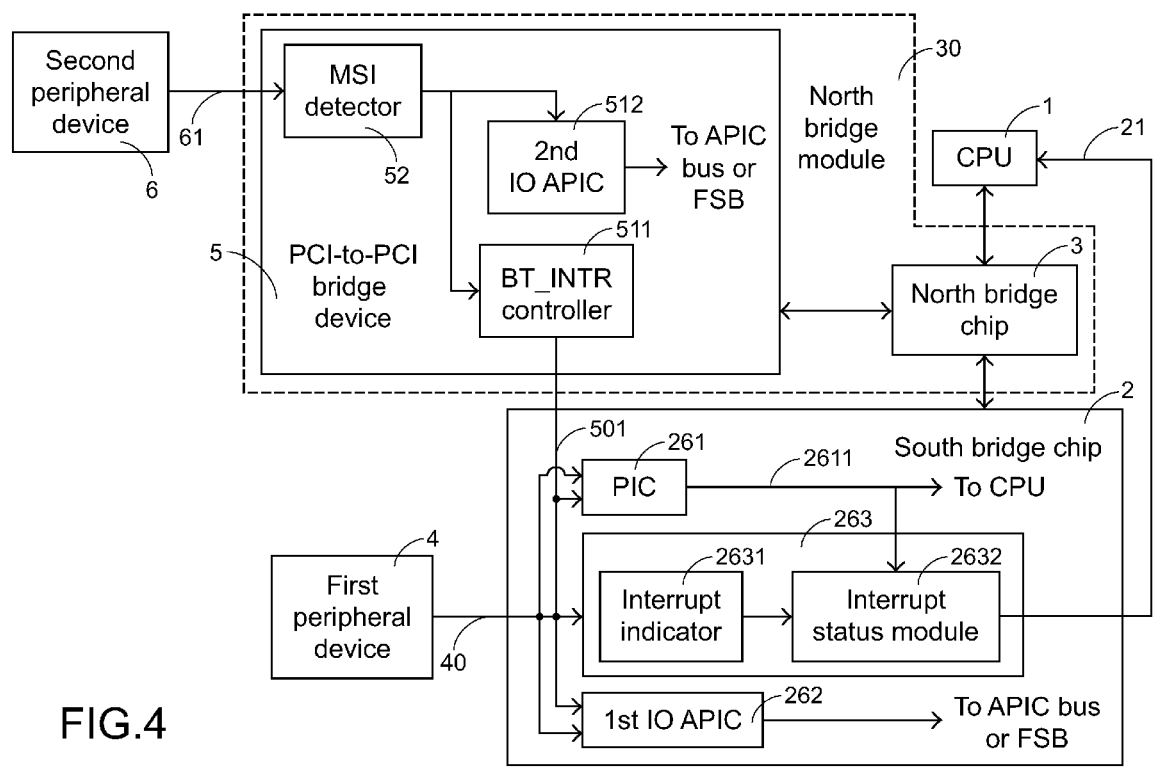
FIG. 4 is a functional block diagram illustrating an interruption control system according to another embodiment of the present invention.

In the above embodiments, the interrupt signal issued by the peripheral device 4 or 6 is transmitted to the south bridge chip 2 or north bridge module 30 via the interrupt signal pin 40 or 60. Alternatively, the interrupt signal can be a message signaled interrupt (MSI) signal issued by the peripheral device 4 or 6 and transmitted via a MSI bus. In an embodiment shown in FIG. 4, an MSI detector 52 is disposed in the north bridge module 30 and enables subsequent waking and interrupting operations in the PIC or IO APIC mode as mentioned above when detecting a MSI signal via a MSI bus 61. Likewise, the MSI detector 52, in lieu of being disposed in the PCI-to-PCI bridge device 5, can also be integrated into the north bridge chip 3.

In addition to the above applications to the peripheral device coupled to the south bridge chip or north bridge chip, it is also feasible for the present control system to process an interrupt signal issued by a peripheral device (not shown) connected to the interrupt status indicating pin for some specific circuit board designs, particularly in the PIC mode.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. An interruption control system for use with a computer system, the computer system comprising a CPU, a north bridge module including a north bridge chip, a south bridge chip and a first peripheral device, the interrupt control system comprising:
   a programmable interrupt controller (PIC) disposed in the south bridge chip, coupled to the first peripheral device, an interrupt status indicating pin of the north bridge module and the CPU, and optionally triggered with an interrupt status indicating signal received through the interrupt status indicating pin or by the first peripheral device to send an interrupt signal to the CPU via an interrupt request signal pin when the computer system is in a PIC mode;
   a first advanced programmable interrupt controller (APIC) disposed in the south bridge chip, coupled to the first peripheral device, disabled when the computer system is in the PIC mode, and enabled when the computer system is in an APIC mode to generate a first memory write cycle message to the CPU in response to the triggering of the first peripheral device; and
   a power management unit disposed in the south bridge chip, coupled to the CPU, the interrupt status indicating pin of the north bridge module and the PIC, and optionally triggered with the interrupt signal received from the PIC or the interrupt status indicating signal received from the interrupt status indicating pin of the north bridge module to change a state of a stop clock signal to awake the CPU from a power-saving state.

2. The interruption control system according to claim 1 further comprising:
   a boot interrupt request (BT_INTR) controller disposed in a PCI-to-PCI bridge device of the north bridge module between the north bridge chip and a second peripheral device of the computer system, and coupled to the south bridge chip via the interrupt status indicating pin for transmitting the interrupt status indicating signal to the power management unit in response to the triggering of the second peripheral device; and
   a second advanced programmable interrupt controller (APIC) disposed in the PCI-to-PCI bridge device, coupled to the second peripheral device, disabled when the computer system is in the PIC mode, and enabled when the computer system is in the APIC mode to generate a second memory write cycle message to the CPU in response to the triggering of the second peripheral device.

3. The interruption control system according to claim 2 wherein the interrupt status indicating signal is further transmitted from the BT_INTR controller to the PIC via the interrupt status indicating pin when the computer system is in the PIC mode.

4. The interruption control system according to claim 3 wherein the PIC is masked from receiving the interrupt status indicating signal and the first APIC omits the interrupt status indicating signal when the computer system is in the APIC mode.

5. The interruption control system according to claim 1 further comprising:
   a boot interrupt request (BT_INTR) controller disposed in the north bridge chip of the north bridge module, coupled to a second peripheral device of the computer system, and further coupled to the south bridge chip via the interrupt status indicating pin for transmitting the interrupt status indicating signal to the power management unit in response to the triggering of the second peripheral device; and
   a second advanced programmable interrupt controller (APIC) disposed in the north bridge chip, coupled to the second peripheral device, disabled when the computer system is in the PIC mode, and enabled when the computer system is in the APIC mode to generate a second memory write cycle message to the CPU in response to the triggering of the second peripheral device.

6. The interruption control system according to claim 5 wherein the interrupt status indicating signal is further transmitted from the BT_INTR controller to the PIC via the interrupt status indicating pin when the computer system is in the PIC mode.

7. The interruption control system according to claim 6 wherein the PIC is masked from receiving the interrupt status indicating signal and the first APIC omits the interrupt status indicating signal when the computer system is in the APIC mode.

8. The interruption control system according to claim 1 wherein the north bridge module further includes a message signaled interrupt (MSI) detector coupled to the second peripheral device for triggering the generation of the interrupt status indicating signal in response to a MSI signal from the second peripheral device.

9. The interruption control system according to claim 1 wherein the power management unit includes:

an interrupt indicator coupled to the interrupt status indicating pin of the north bridge module, disabled when the computer system is in the PIC mode, and enabled when the computer system is in the APIC mode for generating an indicating signal in response to the interrupt status indicating signal; and an interrupt status module coupled to the interrupt indicator and the CPU for changing the state of the stop clock signal to awake the CPU from the power-saving state in response to the triggering of the interrupt indicating signal from the interrupt indicator or the triggering of the interrupt signal from the PIC.

* * * * *